(12) United States Patent
Sarang et al.

(10) Patent No.: US 11,919,279 B1
(45) Date of Patent: Mar. 5, 2024

(54) SCRATCH AND UV RESISTANT FILMS

(71) Applicant: Aisin Corporation, Kariya Aichi (JP)

(72) Inventors: Santosh Sarang, Novi, MI (US); Saida Khan, Canton, MI (US); Masahiro Narita, Novi, MI (US)

(73) Assignee: AISIN Corporation, Kariya (JP)

( * ) Notice: Subject to any disclaimer, the term of this patent is extended or adjusted under 35 U.S.C. 154(b) by 0 days.

(21) Appl. No.: 18/099,297

(22) Filed: Jan. 20, 2023

(51) Int. Cl.
| | |
|---|---|
| *B32B 27/20* | (2006.01) |
| *B32B 7/02* | (2019.01) |
| *B32B 17/10* | (2006.01) |
| *B32B 27/08* | (2006.01) |
| *B32B 27/28* | (2006.01) |
| *B32B 27/30* | (2006.01) |
| *B32B 27/36* | (2006.01) |
| *B32B 27/40* | (2006.01) |

(52) U.S. Cl.
CPC ............... *B32B 27/20* (2013.01); *B32B 7/02* (2013.01); *B32B 17/10018* (2013.01); *B32B 17/1055* (2013.01); *B32B 17/10715* (2013.01); *B32B 17/10752* (2013.01); *B32B 17/10761* (2013.01); *B32B 17/1077* (2013.01); *B32B 17/10779* (2013.01); *B32B 27/08* (2013.01); *B32B 27/281* (2013.01); *B32B 27/288* (2013.01); *B32B 27/30* (2013.01); *B32B 27/308* (2013.01); *B32B 27/36* (2013.01); *B32B 27/365* (2013.01); *B32B 27/40* (2013.01); *B32B 2264/108* (2013.01); *B32B 2274/00* (2013.01); *B32B 2307/412* (2013.01); *B32B 2307/584* (2013.01); *B32B 2307/71* (2013.01); *B32B 2307/732* (2013.01); *B32B 2605/006* (2013.01)

(58) Field of Classification Search
CPC ..... B32B 17/00–17/1099; C03C 17/00–17/44; C04B 32/182
See application file for complete search history.

(56) References Cited

U.S. PATENT DOCUMENTS

| | | | |
|---|---|---|---|
| 4,937,147 A | 6/1990 | Cartier et al. |
| 6,103,998 A | 8/2000 | Kuno et al. |
| 6,916,545 B2 | 7/2005 | Yano et al. |
| 6,998,169 B1 | 2/2006 | Bravet et al. |
| 8,580,378 B2 | 11/2013 | Noguchi |
| 9,139,242 B2 | 9/2015 | Weiss et al. |
| 10,518,507 B2 | 12/2019 | Qian et al. |
| 2013/0143048 A1 | 6/2013 | Kim et al. |
| 2015/0343752 A1 | 12/2015 | Gasworth |

(Continued)

FOREIGN PATENT DOCUMENTS

| | | |
|---|---|---|
| CN | 105751856 A | 7/2016 |
| CN | 113666645 A | 11/2021 |

(Continued)

*Primary Examiner* — Prashant J Khatri
(74) *Attorney, Agent, or Firm* — Christopher G. Darrow; Darrow Mustafa PC

(57) ABSTRACT

A scratch and ultraviolet resistant film includes a polymer-carbon composite film configured to be applied as a thin film on a substrate. The polymer-carbon composite film includes a resin such as a thermoset resin and/or a thermoplastic resin, and between about 0.25 wt. % and about 5 wt. % graphene disposed in the resin. In addition, the polymer-carbon composite film applied as the thin film on the substrate has a thickness between about 0.2 mm and about 1 mm.

20 Claims, 4 Drawing Sheets

(56) References Cited

U.S. PATENT DOCUMENTS

| | | | |
|---|---|---|---|
| 2016/0221870 A1 | 8/2016 | Arita et al. | |
| 2017/0103826 A1* | 4/2017 | Al-Harthi | C08J 5/18 |
| 2017/0218141 A1* | 8/2017 | Nosker | C08K 3/042 |
| 2019/0359040 A1 | 11/2019 | Mathew | |
| 2021/0339609 A1* | 11/2021 | Farreyrol | B32B 17/10761 |

FOREIGN PATENT DOCUMENTS

| | | |
|---|---|---|
| CN | 111302649 A | 6/2022 |
| DE | 2548904 A1 | 5/1977 |
| DE | 19703720 A1 | 7/1998 |
| JP | 2004051681 A | 2/2004 |
| JP | 2005035249 A | 2/2005 |
| JP | 2014069518 A | 4/2014 |

* cited by examiner

SCRATCH AND UV RESISTANT FILMS

TECHNICAL FIELD

The present disclosure relates generally to scratch and ultraviolet (UV) resistant films, and more particularly, to polymer-carbon composite scratch and UV resistant films.

BACKGROUND

Glass and other transparent substrates, such as polycarbonate (PC) and poly(methyl methacrylate) (PMMA) substrates, are generally used for windows, sunroofs, etc., in vehicles. In addition, such substrates are prone to scratching and generally do not provide ultraviolet (UV) protection.

The present disclosure addresses issues related to scratching and UV protection of transparent substrates, and other issues related to transparent substrates.

SUMMARY

This section provides a general summary of the disclosure and is not a comprehensive disclosure of its full scope or its features.

In one form of the present disclosure, a scratch and ultraviolet (UV) resistant film includes a polymer-carbon composite film configured to be applied as a thin film on a substrate. The polymer-carbon composite film includes a resin selected from at least one of a thermoset resin and a thermoplastic resin, and between about 0.25 wt. % and about 5 wt. % graphene disposed in the resin.

In another form of the present disclosure, a scratch and UV resistant film configured to be applied as a thin film on a substrate is disclosed. The scratch and UV resistant film is a polymer-carbon composite film with a polyethylene terephthalate (PET) resin and between about 0.25 wt. % and about 5 wt. % graphene disposed in the resin.

In still another form of the present disclosure, a scratch and UV resistant film includes a polymer-carbon composite film with a polyethylene terephthalate (PET) resin, between about 0.4 wt. % and about 1.0 wt. % graphene disposed in the resin, a transparent substrate, and the polymer-carbon composite film is disposed on at least one of a first side and a second side opposite the first side of the transparent substrate.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides a polymer-carbon composite film made from a resin with additions of graphene. Substrates, such as glass and other transparent substrates are prone to scratching and may not provide UV protection. Accordingly, in one form of the present disclosure a polymer-carbon composite film with scratch and UV resistant properties is provided. As used herein, the term "UV" refers to ultraviolet radiation and the phrases "UV resistant" refers to blocking, reflecting and/or absorbing UV such that the amount or intensity of UV passing through the substrate is reduced. The polymer-carbon composite film includes at least one of a thermoplastic resin and a thermoset resin, and between about 0.25 weight (wt.) % and about 5.0 wt. % graphene. The polymer-carbon composite film is configured to be applied to a substrate, such as glass, PC, PMMA, among others, and is a lightweight, high performance polymeric film that, when applied to the substrate, provides scratch and UV resistance, and reduces light and heat transmittance therethrough.

Figure 1:
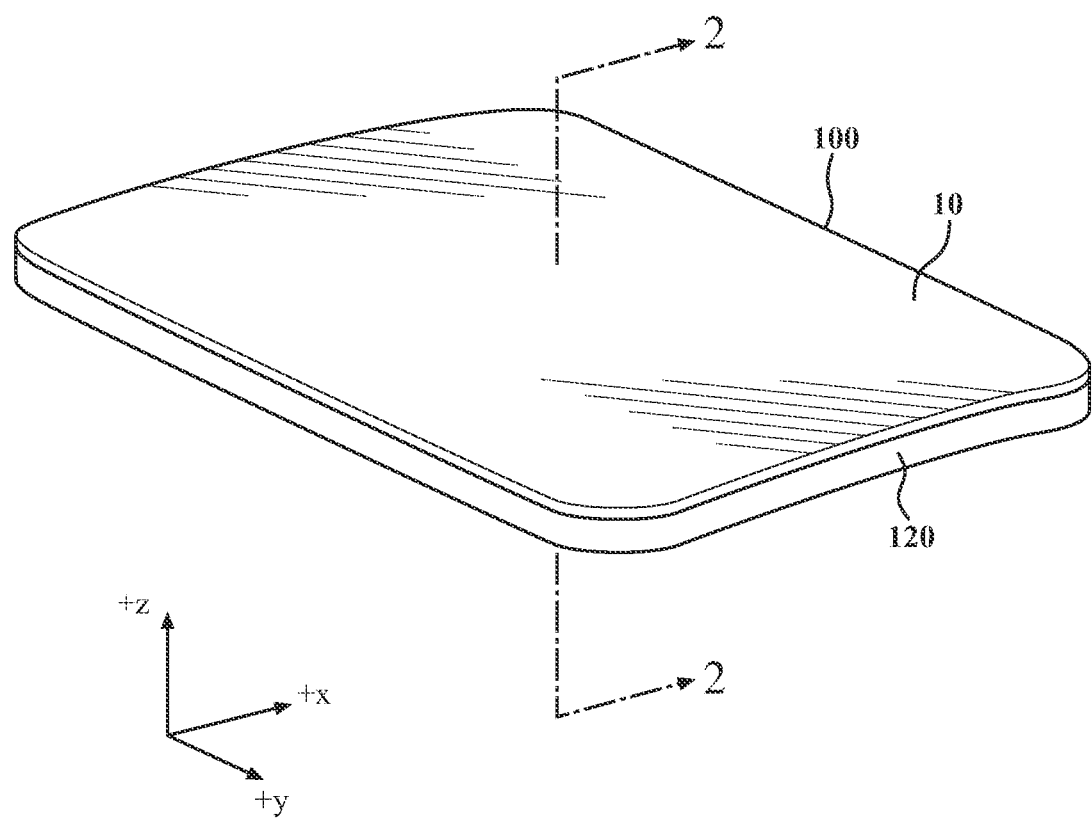
FIG. 1 is a perspective view of a substrate with a scratch and UV resistant film according to the teachings of the present disclosure.
Figure 2:
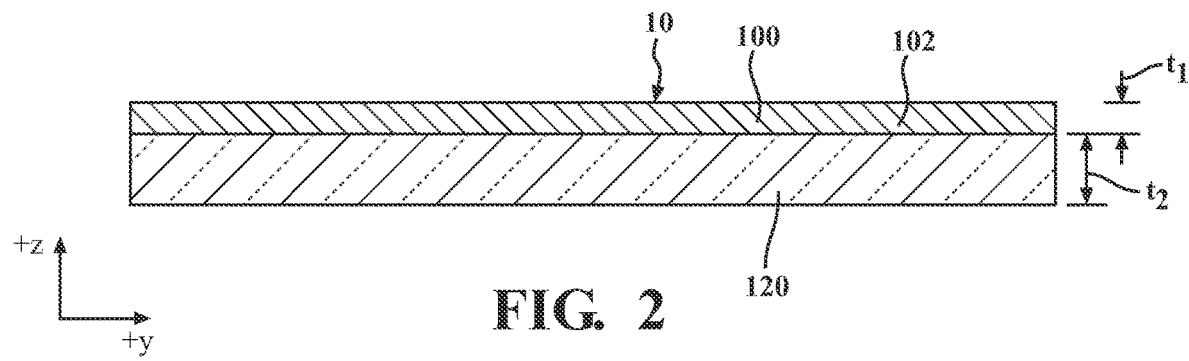
FIG. 2 is a cross-sectional view of section 2-2 in FIG. 1.

Referring to FIGS. 1-2, one non-limiting example of a polymer-carbon composite film 10 disposed on a substrate 120 according to the teachings of the present disclosure is shown. Particularly, a perspective view of the polymer-carbon composite film 10 disposed on the substrate 120 is shown in FIG. 1 and a cross-sectional view of section 2-2 in FIG. 1 is shown in FIG. 2. In some variations, the substrate 120 is a transparent substrate formed from a transparent material such as glass, polycarbonate (PC), and poly(methyl methacrylate) (PMMA), among others. Non-limiting examples of the substrate, i.e., the use or type of substrate, include vehicle windows, vehicle sunroofs, vehicle quarter windows, residential windows, industrial windows, and retail windows, among others. In addition, non-limiting examples of techniques or processes used to apply or dispose the polymer-carbon composite film 10 on the substrate 120 include adhesive bonding, two-shot molding, co-extrusion, coating, and lamination, among others.

The polymer-carbon composite film 10 includes a resin 100 (FIG. 2). The resin 100 can be a thermoplastic and/or a thermoset resin. In some variations the resin 100 is a thermoplastic resin, for example a thermoplastic resin selected from at least one of polyethylene terephthalate (PET), acrylic, thermoplastic polyurethane (TPU), polycarbonate (PC), polyetherimide (PEI), and polyether ether ketone (PEEK), among others. In other variations, the resin 100 is a thermoset resin, for example, a thermoset resin selected from at least one of polyurethane (PU), acrylic, and vinyl, among others. And in at least one variation, the resin 100 is a combination or mixture of a thermoplastic resin and a thermoset resin.

In addition to the resin 100, the polymer-carbon composite film 10 includes graphene 102. And while FIG. 2, and other figures in the present disclosure, illustrate the graphene 102 oriented generally horizontal (y-direction) in the resin 100, it should be understood that the graphene 102 can be oriented generally vertical (z-direction) in the resin 100, oriented generally at one or more desired angles between the horizontal and the vertical, or randomly oriented within the resin 100.

In some variations, the polymer-carbon composite film 10 includes between about 0.25 wt. % and about 5 wt. % of the graphene 102. For example, in at least one variation the polymer-carbon composite film 10 includes between about 0.25 wt. % and about 2.5 wt. % graphene 102, between about 0.25 wt. % and about 1.5 wt. % graphene 102, between about 0.25 wt. % and about 0.75 wt. % graphene 102, or between about 0.4 wt. % and about 0.6 wt. % graphene 102. In yet other variations, the polymer-carbon composite film 10 includes between about 0.5 wt. % and about 5.0 wt. % graphene 102, for example between about 1.0 wt. % and about 5.0 wt. % graphene 102 or between about 2.5 wt. % and about 5.0 wt. % graphene 102. And in some variations, the polymer-carbon composite film 10 includes between about 1.0 wt. % and about 4.0 wt. % graphene 102, for example between about 1.5 wt. % and about 3.5 wt. % graphene 102, between about 2.0 wt. % and about 3.0 wt. % graphene 102, or between about 2.25 wt. % and about 3.75 wt. % graphene 102. And in at least one variation, the resin 100 of the polymer-carbon composite film 10 is PET resin and the graphene 102 content is between about 0.4 wt. % and about 0.6 wt. %.

Still referring to FIG. 2, the polymer-carbon composite film 10 has an average thickness $t_1$ (FIG. 2) and the substrate 120 has an average thickness $t_2$. Non-limiting examples of the average thickness $t_1$ include thicknesses between about 0.2 millimeter (mm) and about 0.5 mm, between about 0.2 mm and about 0.4 mm, between about 0.2 mm and about 0.3 mm, between about 0.3 mm and about 0.5 mm, between about 0.4 mm and about 0.5 mm, and between about 0.3 mm and about 0.4 mm. Also, non-limiting examples of the average thickness $t_2$ include between about 2 mm and about 6 mm, between about 2 mm and about 5 mm, between about 2 mm and about 4 mm, between about 2 mm and about 3 mm, between about 3 mm and about 6 mm, between about 4 mm and about 6 mm, between about 5 mm and about 6 mm, between about 3 mm and about 5 mm, between about 3 mm and about 4 mm, and between about 5 mm and about 6 mm.

Figure 3:
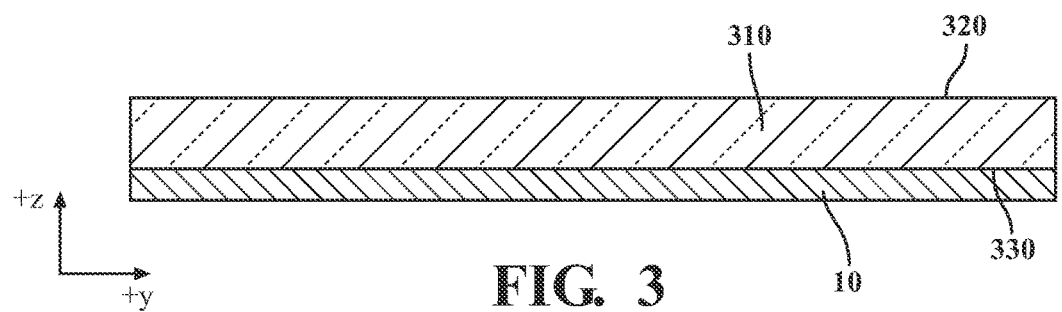
FIG. 3 is a cross-sectional view of section 2-2 in FIG. 1, where the substrate of FIG. 1 is a transparent substrate.

Referring now to FIG. 3, in one form of the present disclosure, the polymer-carbon composite film 10 is disposed on a transparent substrate 310 having a first side 320 and a second side 330 opposite and spaced apart from the first side 320. As used herein, the term "side" refers to a surface of a substrate. In some variations, the transparent substrate 310 is a glass substrate (i.e., a substrate formed from glass). In other variations, the transparent substrate 310 is a PC substrate, and in at least one variation the transparent substrate 310 is a PMMA substrate. The transparent substrate can be, or can be configured to be installed as, a vehicle window, vehicle sunroof, or a vehicle quarter window, among other things. As illustrated in FIG. 3, the polymer-carbon composite film 10 is disposed on the second side 330 of the transparent substrate 310. In at least one variation, the first side 320 of the transparent substrate 310 faces an exterior space of a vehicle (e.g., an external environment of a vehicle) and the second side 330 faces an interior space of a vehicle (e.g., the cabin of a vehicle). And in such variations, the polymer-carbon composite film 10 disposed on or applied to the second side 330 of the transparent substrate 310 provides the transparent substrate 310 with scratch protection from interior sources (e.g., fingers, hangers, tools, etc.) and/or UV protection for occupants of the vehicle.

It should be understood that while FIG. 3 illustrates the polymer-carbon composite film 10 as being disposed on the second side 330 of the transparent substrate 310, additionally or alternatively, the polymer-carbon composite film 10 may be disposed on the first side 320 of the transparent substrate 310. Applying the polymer-carbon composite film 10 to the first side 320 of the transparent substrate 310 provides the transparent substrate 310 with scratch protection from exterior sources (e.g., branches, hail, etc.) and additionally provides UV protection for occupants of the vehicle. It should also be understood that the polymer-carbon composite film 10 being "disposed on" the second side 330 of the transparent substrate 310 includes the polymer-carbon composite film 10 disposed directly on (i.e., in direct contact with) the second side 330 of the transparent substrate 310, and the polymer-carbon composite film 10 disposed on the second side 330 of the transparent substrate 310 with one or more additional layers or films between the polymer-carbon composite film 10 and the second side 330 of the transparent substrate 310. That is, in some variations the polymer-carbon composite film 10 is disposed directly on and is in direct contact with the transparent substrate 310 (and other substrates disclosed herein), while in other variations one or more additional layers of films are disposed between the polymer-carbon composite film 10 and the transparent substrate 310 as discussed in greater detail below.

Figure 4:
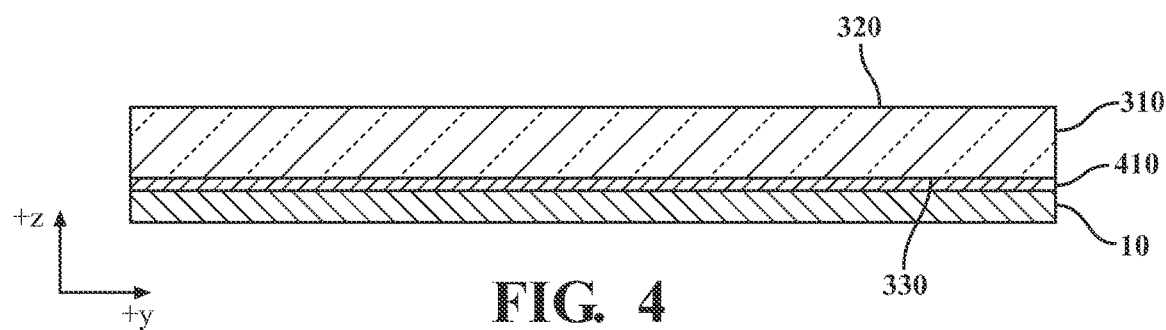
FIG. 4 is a cross-sectional view of section 2-2 in FIG. 1, where the substrate of FIG. 1 is a transparent substrate and an electrochromic film is disposed on the transparent substrate.

Referring to FIG. 4, in another form of the present disclosure, the polymer-carbon composite film 10 is disposed on the second side 330 of the transparent substrate 310 and an electrochromic film 410 is sandwiched between the second side 330 and the polymer-carbon composite film 10. And similar to FIG. 3, in some variations the first side 320 faces an exterior space of a vehicle (e.g., an environment of a vehicle) and the second side 330 faces an interior space of a vehicle (e.g., the cabin of a vehicle). However, in other variations, the first side 320 faces an interior space of a vehicle and the second side 330 faces an exterior space of a vehicle.

As used herein, the phrases "sandwiched between" and "disposed between" as used herein refer to a layer (e.g., the electrochromic film 410) between and in direct contact with two additional layers (e.g., the second side 330 of the transparent substrate 310 and the polymer-carbon composite film 10), or refer to a layer (e.g., the electrochromic film 410) between and not in direct contact with two additional layers (e.g., the second side 330 of the transparent substrate 310 and/or the polymer-carbon composite film 10). Stated differently, in some variations the phrases "sandwiched between" and "disposed between" refers to a layer disposed between and in direct contact with two adjacent layers, while in other variations the phrases "sandwiched between" and "disposed between" refer to a layer and one or more additional layers between two adjacent layers. For example, additional resin films and/or reinforcement layers, such as Gorilla Glass™, may be present between the polymer-carbon composite film 10 and the second side 330 of the transparent substrate 310.

The electrochromic film 410 is, in one or more variations, a film that changes the appearance of the transparency of the transparent substrate 310 by, for example, acting as a tinted coating. The electrochromic film 410 may be monochromatic and/or include a pattern. In one form, the polymer-carbon composite film 10 is applied to the electrochromic film 410 using an adhesive (e.g., a clear adhesive, such as glue), among other things.

Figure 5:
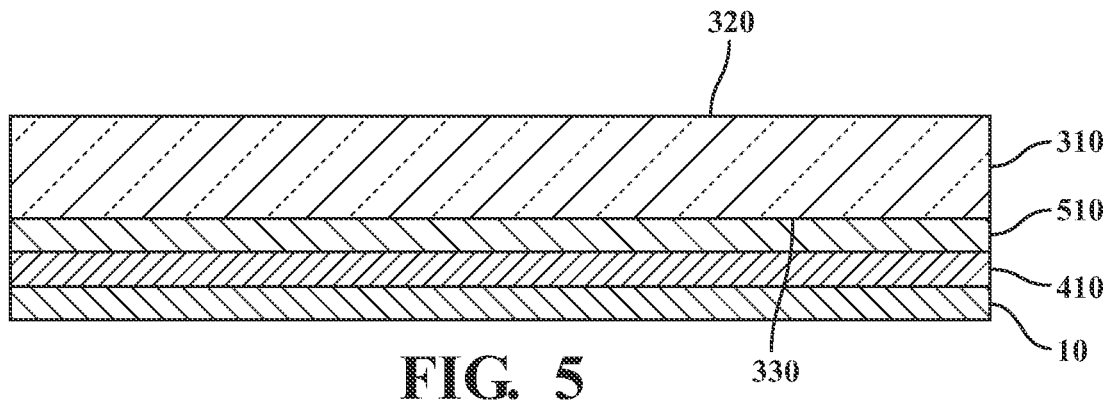
FIG. 5 is a cross-sectional view of section 2-2 in FIG. 1, where the substrate of FIG. 1 is a transparent substrate and an electrochromic film is disposed on the transparent substrate between a polymer-carbon composite film and another polymer-carbon composite film.

Referring to FIG. 5, in still another form of the present disclosure, the polymer-carbon composite film 10 (also referred to herein as a "first polymer-carbon composite film 10") is disposed on the second side 330 of the transparent substrate 310 with the electrochromic film 410 and another polymer-carbon composite film 510 (also referred to herein as a "second polymer-carbon composite film 510") disposed between the polymer-carbon composite film 10 and the second side 330. That is, the electrochromic film 410 is sandwiched between the first polymer-carbon composite film 10 and the second polymer-carbon composite film 510. In one form, the electrochromic film 410 is sandwiched between the first polymer-carbon composite film 10 and the second polymer-carbon composite film 510 using adhesives, among other things, applied to the first polymer-carbon composite film 10 and/or the second polymer-carbon composite film 510. And while not shown in FIG. 5, the second polymer-carbon composite film 510 can have a thickness $t_1$ as described with respective to the first polymer-carbon composite film 10 in FIG. 2.

In some variations, the first polymer-carbon composite film 10 and the second polymer-carbon composite film 510 are the same composition with only slight variations. For example, the first polymer-carbon composite film 10 and the second polymer-carbon composite film 510 may be formed from the same resin and the wt. % graphene differ by negligible amounts (e.g., +/−0.01 wt. %). In other variations, the first polymer-carbon composite film 10 and the second polymer-carbon composite film 510 are not the same. For example, the first polymer-carbon composite film 10 and the second polymer-carbon composite film 510 are formed from different resins. As another example, the amount of graphene disposed in the resin of the first polymer-carbon composite film 10 and the second polymer-carbon composite film 510 are different. In any case, the first polymer-carbon composite film 10 and the second polymer-carbon composite film 510 are both formed from at least one of a thermoplastic resin and a thermoset resin, and between about 0.25 wt. % and about 5 wt. % graphene.

Figure 6:
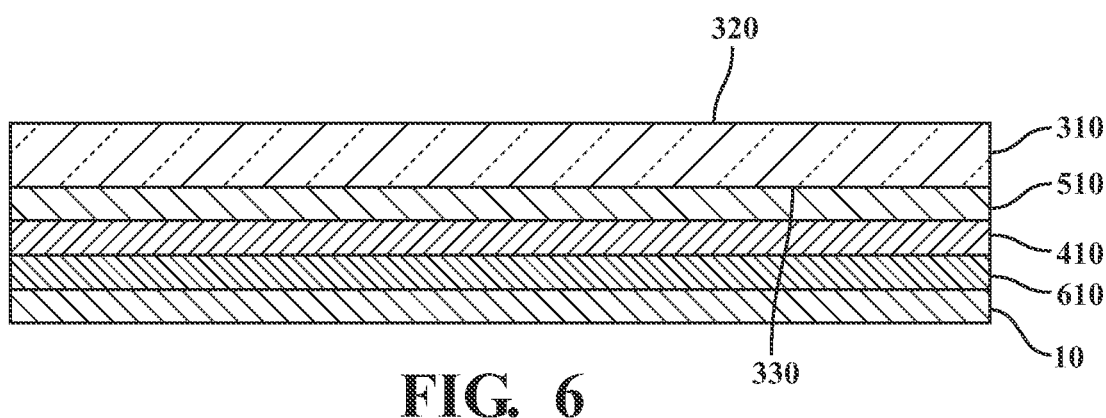
FIG. 6 is a cross-sectional view of section 2-2 in FIG. 1, where the substrate of FIG. 1 is a transparent substrate and an electrochromic film and polyvinyl butyral laminate film are disposed on the transparent substrate between a polymer-carbon composite film and another polymer-carbon composite film.

Referring to FIG. 6, in yet another form of the present disclosure, the first polymer-carbon composite film 10 is disposed on the second side 330 of the transparent substrate 310, and the electrochromic film 410, the second polymer-carbon composite film 510, and a polyvinyl butyral (PVB) laminate film 610 are disposed between the first polymer-carbon composite film 10 and the second side 330. That is, the electrochromic film 410 and the PVB laminate film 610 are sandwiched between the first polymer-carbon composite film 10 and the second polymer-carbon composite film 510. In one form, the electrochromic film 410 and/or the PVB laminate film 610 are/is sandwiched between the first polymer-carbon composite film 10 and the second polymer-carbon composite film 510 using adhesives, among other things, applied to the first polymer-carbon composite film 10 and/or the second polymer-carbon composite film 510. And while FIG. 6 illustrates the PVB laminate film 610 proximal the first polymer-carbon composite film 10 and the electrochromic film 410 proximal the second polymer-carbon composite film 510, in some variations the PVB laminate film 610 is proximal the second polymer-carbon composite film 510 and the electrochromic film 410 is proximal the first polymer-carbon composite film 10.

Figure 7:
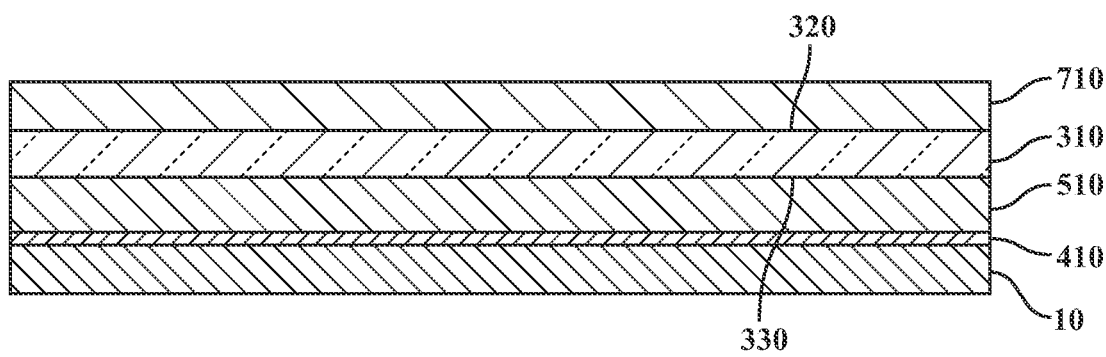
FIG. 7 is a cross-sectional view of section 2-2 in FIG. 1, where the substrate of FIG. 1 is a transparent substrate, a polymer-carbon composite film is disposed on a first side of the transparent substrate, and an electrochromic film is disposed on a second side of the transparent substrate between a polymer-carbon composite film and another polymer-carbon composite film.

Referring to FIG. 7, in still yet another form of the present disclosure, the first polymer-carbon composite film 10 is disposed on the second side 330 of the transparent substrate 310, the electrochromic film 410 and the second polymer-carbon composite film 510 are disposed between the first polymer-carbon composite film 10 and the second side 330, and still another polymer-carbon composite film 710 (also referred to herein as a "third polymer-carbon composite film 710") is disposed on the first side 320 of the transparent substrate 310. And while not shown in FIG. 7, the third polymer-carbon composite film 710 can have a thickness $t_1$ as described with respective to the first polymer-carbon composite film 10 in FIG. 2.

Figure 8:
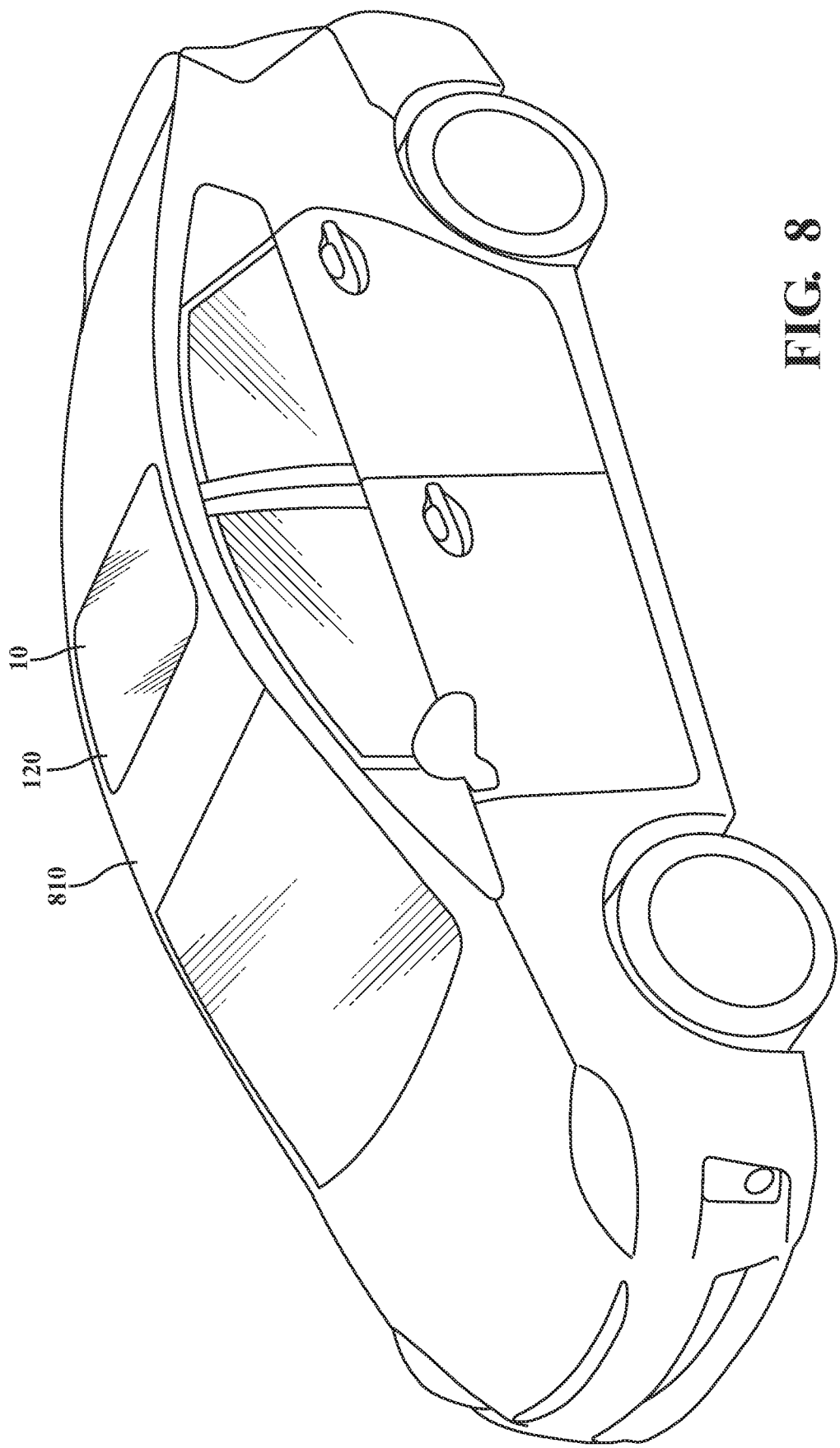
FIG. 8 is a perspective view of a vehicle with a sunroof according to the teachings of the present disclosure.

Referring now to FIG. 8, one example of a vehicle 810 with the polymer-carbon composite film 10 according to the teachings of the present disclosure is illustrated. Particularly, a perspective view of the substrate 120 with the polymer-carbon composite film 10 in the form of a sunroof installed in the vehicle 810 is shown. And while FIG. 8 only shows or illustrates the polymer-carbon composite film 10, in some variations the substrate 120 is additionally coated with an electrochromic film, a PVB laminate, and/or additional films as previously discussed.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A scratch and ultraviolet (UV) resistant film comprising:
    a first polymer-carbon composite film comprising:
        a resin selected from at least one of a thermoset resin and a thermoplastic resin; and
        between about 0.25 wt. % and about 5 wt. % graphene disposed in the resin,
        the first polymer-carbon composite film configured to be applied as a thin film on a transparent substrate with a first side and a second side opposite the first side,
        wherein the first polymer-carbon composite film is disposed on the second side, an electrochromic film is disposed on the second side and sandwiched between the first polymer-carbon composite film disposed on the second side and a second polymer-carbon composite film, and a polyvinyl butyral film is disposed between the second side and the first polymer-carbon composite film.

2. The scratch and UV resistant film according to claim 1, wherein the resin is the thermoplastic resin comprising at least one of polyethylene terephthalate (PET), acrylic, thermoplastic polyurethane (TPU), polycarbonate (PC), polyetherimide (PEI), and polyether ether ketone (PEEK).

3. The scratch and UV resistant film according to claim 1, wherein the resin is the thermoset resin comprising at least one of polyurethane (PU), acrylic, and vinyl.

4. The scratch and UV resistant film according to claim 1, wherein the graphene is between about 0.25 wt. % and about 1.0 wt. %.

5. The scratch and UV resistant film according to claim 1, wherein the graphene is between about 0.4 wt. % and about 0.6 wt. %.

6. The scratch and UV resistant film according to claim 1, wherein the transparent substrate is a glass substrate.

7. The scratch and UV resistant film according to claim 1, wherein the transparent substrate is a polycarbonate (PC) substrate.

8. The scratch and UV resistant film according to claim 1, wherein the transparent substrate is a poly(methyl methacrylate) (PMMA) substrate.

9. The scratch and UV resistant film according to claim 1, wherein the first side faces an exterior space of a vehicle and the second side faces an interior space of the vehicle.

10. The scratch and UV resistant film according to claim 1, wherein the polyvinyl butyral film is disposed between the first polymer-carbon composite film and the electrochromic film.

11. The scratch and UV resistant film according to claim 1, wherein a third polymer-carbon composite film is disposed on the first side of the transparent substrate.

12. The scratch and UV resistant film according to claim 1, wherein a thickness of the first polymer-carbon composite film and the second polymer-carbon composite film is between about 0.2 mm and about 1 mm.

13. The scratch and UV resistant film according to claim 1,
    wherein a thickness of the transparent substrate is between about 2 mm and about 6 mm, and a thickness of the first polymer-carbon composite film and the second polymer-carbon composite film is between about 0.2 mm and about 1 mm.

14. A scratch and ultraviolet (UV) resistant film comprising:
    a first polymer-carbon composite film comprising:
        a polyethylene terephthalate (PET) resin; and
        between about 0.25 wt. % and about 5 wt. % graphene disposed in the PET resin, the first polymer-carbon composite film configured to be applied as a thin film on a transparent substrate with a first side and a second side opposite the first side,
        wherein the first polymer-carbon composite film is disposed on the second side, an electrochromic film is disposed on the second side and sandwiched between the first polymer-carbon composite film disposed on the second side and a second polymer-carbon composite film, and a polyvinyl butyral film is disposed between the second side and the first polymer-carbon composite film.

15. The scratch and UV resistant film according to claim 14, wherein the graphene is between about 0.25 wt. % and 1.0 wt. % graphene.

16. The scratch and UV resistant film according to claim 14, wherein the graphene is between about 0.4 wt. % and 0.6 wt. % graphene.

17. The scratch and UV resistant film according to claim 14, wherein a thickness of the first polymer-carbon composite film and the second polymer-carbon composite film is between about 0.2 mm and about 1 mm.

18. A scratch and ultraviolet (UV) resistant film comprising:
    a first polymer-carbon composite film comprising:
        a polyethylene terephthalate (PET) resin; and between about 0.4 wt. % and about 1.0 wt. % graphene disposed in the PET resin, the first polymer-carbon composite film configured to be applied as a thin film on a transparent substrate with a first side and a second side opposite the first side, wherein the first polymer-carbon composite film is disposed on the second side, an electrochromic film is disposed on the second side and sandwiched between the first polymer-carbon composite film disposed on the second side and a second polymer-carbon composite film, and a polyvinyl butyral film is disposed between the second side and the first polymer-carbon composite film.

19. The scratch and UV resistant film according to claim 18, wherein a thickness of the transparent substrate is between about 2 mm and about 6 mm, and a thickness of the first polymer-carbon composite film and the second polymer-carbon composite film is between about 0.2 mm and about 1 mm.

20. The scratch and UV resistant film according to claim 18, wherein the graphene is between about 0.4 wt. % and 0.6 wt. % graphene.

* * * * *